Nov. 12, 1963 H. J. BUTLER 3,110,365

DISC BRAKES HAVING RELEASABLE TORQUE RECEIVING MEMBERS

Filed April 7, 1961 8 Sheets-Sheet 1

Inventor:
Henry James Butler
by Benj. T. Rauber
his attorney

Inventor
Henry James Butler
by Benj T Rauber
his attorney

Nov. 12, 1963 H. J. BUTLER 3,110,365

DISC BRAKES HAVING RELEASABLE TORQUE RECEIVING MEMBERS

Filed April 7, 1961 8 Sheets-Sheet 3

Inventor:
Henry James Butler
by Benj. T. Rauber
his attorney

Nov. 12, 1963 H. J. BUTLER 3,110,365

DISC BRAKES HAVING RELEASABLE TORQUE RECEIVING MEMBERS

Filed April 7, 1961 8 Sheets-Sheet 4

Inventor:
Henry James Butler
by Benj. T. Rauber
his attorney

Nov. 12, 1963 H. J. BUTLER 3,110,365

DISC BRAKES HAVING RELEASABLE TORQUE RECEIVING MEMBERS

Filed April 7, 1961 8 Sheets-Sheet 5

Inventor:
Henry James Butler
by Benj. T. Rauber
his attorney

Nov. 12, 1963 H. J. BUTLER 3,110,365

DISC BRAKES HAVING RELEASABLE TORQUE RECEIVING MEMBERS

Filed April 7, 1961 8 Sheets-Sheet 6

Inventor
Henry James Butler
by Attorney:
Benj. T. Rauber

Inventor:
Henry James Butler
by Benj. T. Rauber
his attorney

DISC BRAKES HAVING RELEASABLE TORQUE RECEIVING MEMBERS

Filed April 7, 1961 8 Sheets-Sheet 8

Inventor:
Henry James Butler
by Benj. T. Rauber
his attorney

United States Patent Office 3,110,365
Patented Nov. 12, 1963

3,110,365

DISC BRAKES HAVING RELEASABLE TORQUE RECEIVING MEMBERS

Henry James Butler, Sutton Coldfield, England, assignor to Dunlop Rubber Company Limited, London County, England, a British company Filed Apr. 7, 1961, Ser. No. 101,585
2 Claims. (Cl. 188—73)

In my Patent No. 2,948,356, granted August 9, 1960 I have described a disc brake comprising a rotatable disc, a rigid, non-rotatable slotted base member completely encircling the disc on a chord thereof with the edges of the slot close to the surfaces of the disc, friction pads associated with the base member and located on opposite sides of the slot therein and mechanism for effecting braking engagement between the friction pads and the disc.

The present invention provides an improvement in or modification of this disc brake which includes housings mounted on the base member on opposite sides of the disc and each associated with one of the friction pads, guides for guiding the friction pads for axial movement into braking engagement with the disc, a brake operating mechanism associated with each housing and a rigid connection between the housings which extends axially and outside the periphery of the disc. Preferably the guides are detachable and when detached, permit the withdrawal from the housings of the friction pads, as such or together with associated backing plates, in a sideways direction, i.e. parallel to the length of the slot in the base member. If preferred, however, provision may be made for removal of the friction pads, as such or together with backing plates, in a radial direction, i.e. a direction at right angles to the length of the slot in the base member.

Certain embodiments of disc brake according to the invention will now be described in more detail, by way of example, with reference to the accompanying drawings, in which.

Figure 1:
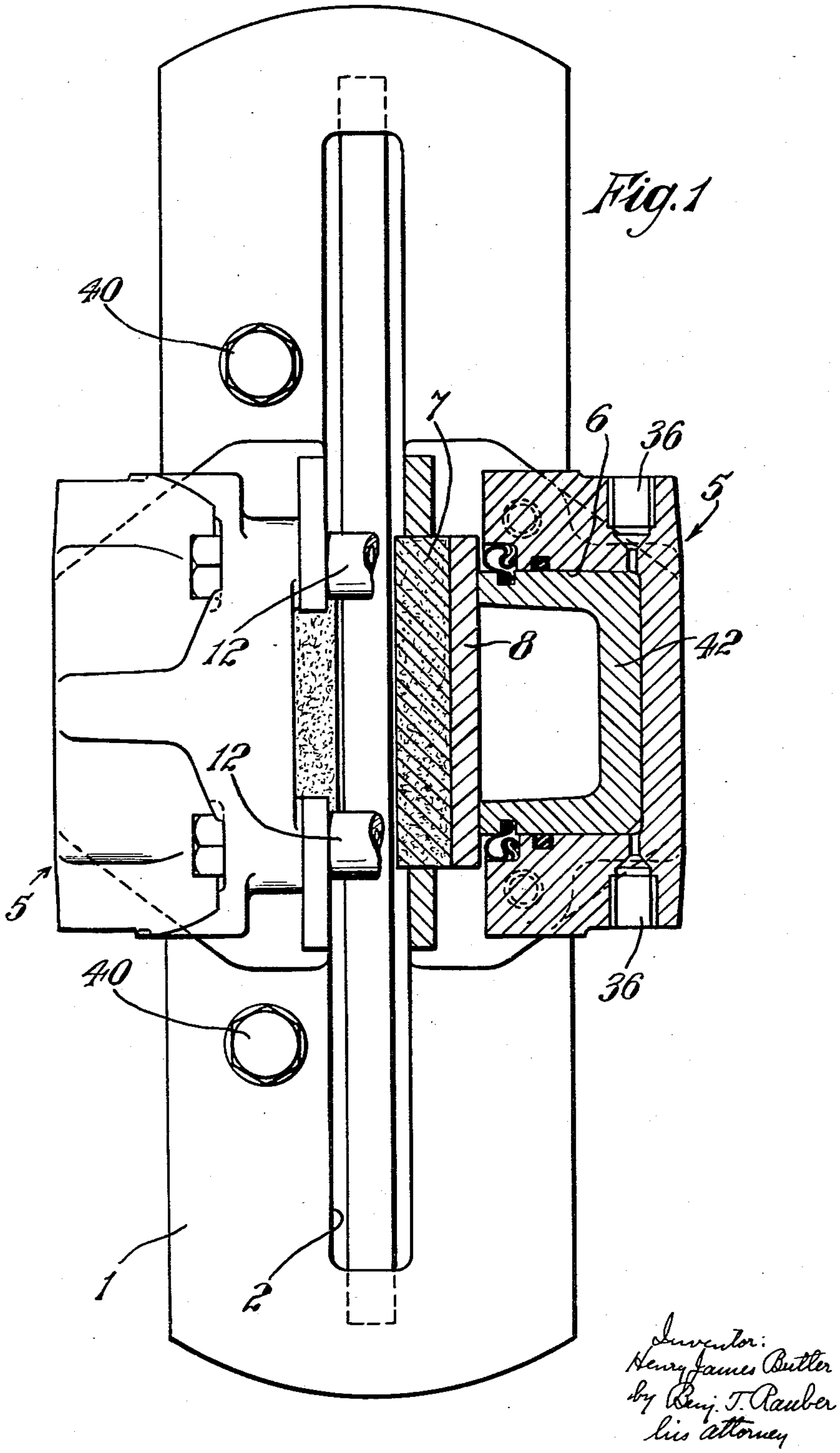
FIGURE 1 is a plan view, partly in section, of the first form of disc brake.
Figure 2:
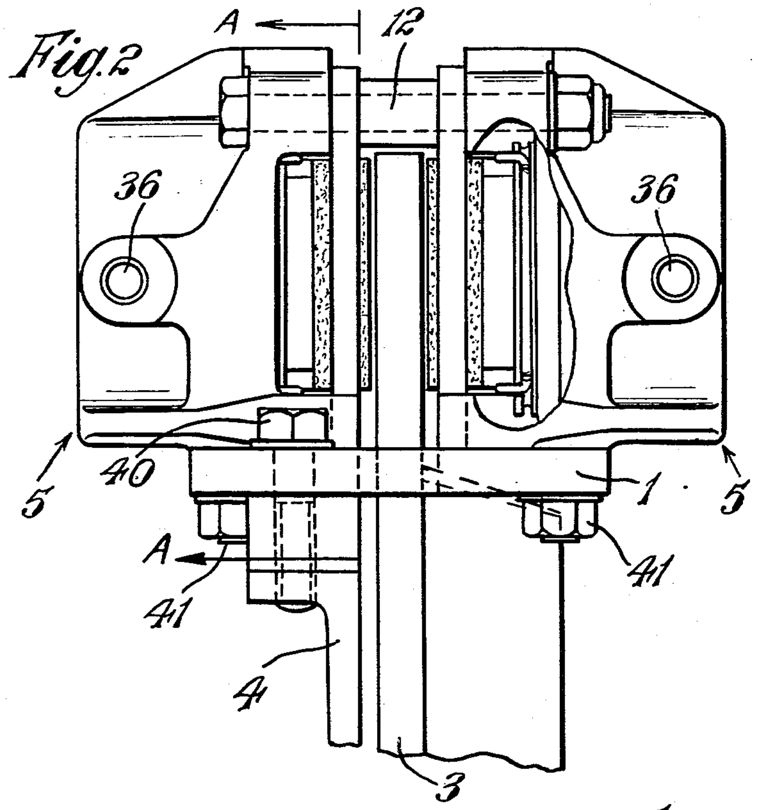
FIGURE 2 is a corresponding end elevation.
Figure 4:
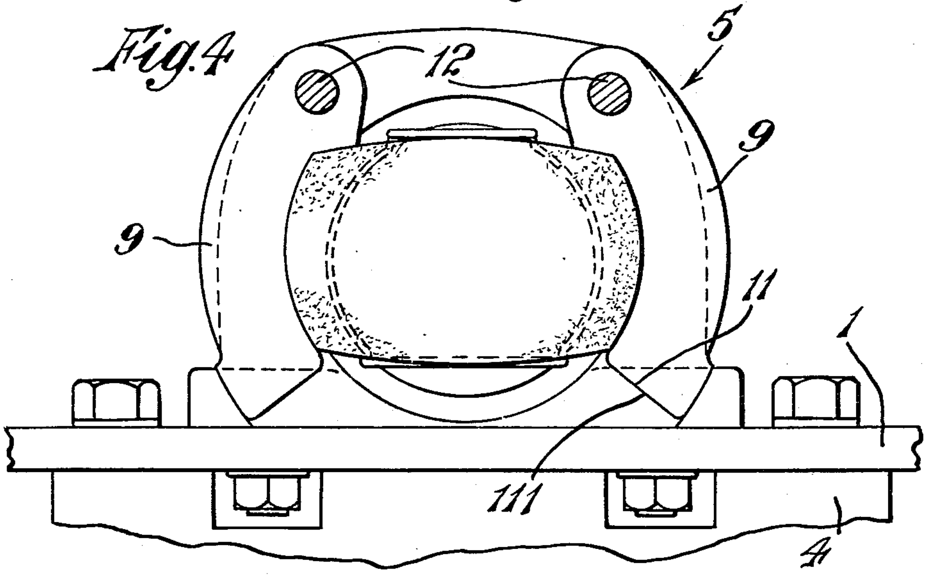
FIGURE 4 is a section on the line A—A in FIGURE 2.
Figure 3:
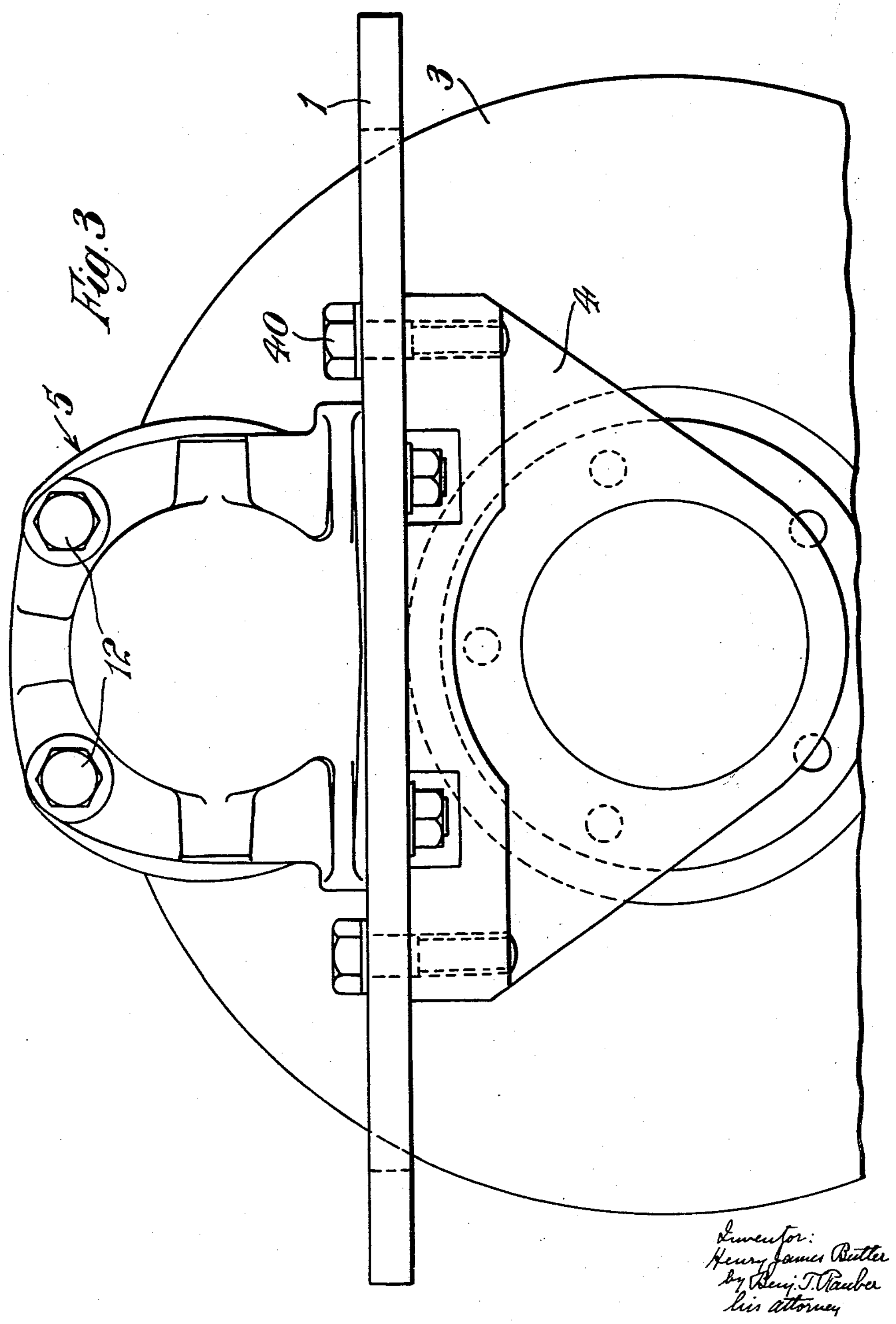
FIGURE 3 is a corresponding side elevation.

The disc brake shown in FIGURES 1–5 comprises a base plate 1 of substantially rectangular shape having a longitudinal slot 2. The width of the slot 2 is slightly greater than that of an associated braking disc 3 which is mounted to rotate with the wheel to be braked. The plate 1 is fitted chord-wise over the disc 3 as shown. A bracket 4 attached by bolts 40 to one side of the plate 1 is secured to a non-rotatable part of the wheel assembly.

The ends of the slot 2 are spaced a short distance only from the periphery of the disc 3. The two opposite ends of the base plate which straddle the periphery of the disc are of substantial width and this imparts great strength and rigidity to the plate. The plate may comprise a single stamping or it may be cut from a length of extruded section which may conveniently comprise a pair of strengthening ribs, one on each longitudinal edge, the slot being subsequently machined between them.

The base plate is light and, since it requires but little machining, is very economical to manufacture.

Mounted on the base plate 1 on opposite sides of the disc 3 are a pair of housings 5 each of which may conveniently be constituted by a die-stamping. The housings 5 are secured to the base plate by bolts 41 and each includes a cylinder 6, the open end of which is presented towards the braking surface of the disc and which is formed with inlets 36 for admission of fluid under pressure. A piston 42 is provided in each cylinder 6, and this abuts a friction pad assembly located between the piston and the adjacent braking surface of the disc 3. The housings 5 are rigidly connected by a pair of tie bolts 12 which are situated clear of the periphery of the disc 3.

Each friction pad assembly comprises a pad 7 of friction material bonded to a backing plate 8, which is held to the piston 42 by a wire clip 43 engaging grooves 44 in the backing plate. Each housing 5 is provided with a pair of guides 9 for the friction pad assembly which take the torque when the brake is applied. The guides 9 are formed with holes 10 by which they embrace the tie bolts 12 and have inclined end faces 11 which abut against corresponding inclined faces 111 on the housing 5.

Figure 5:
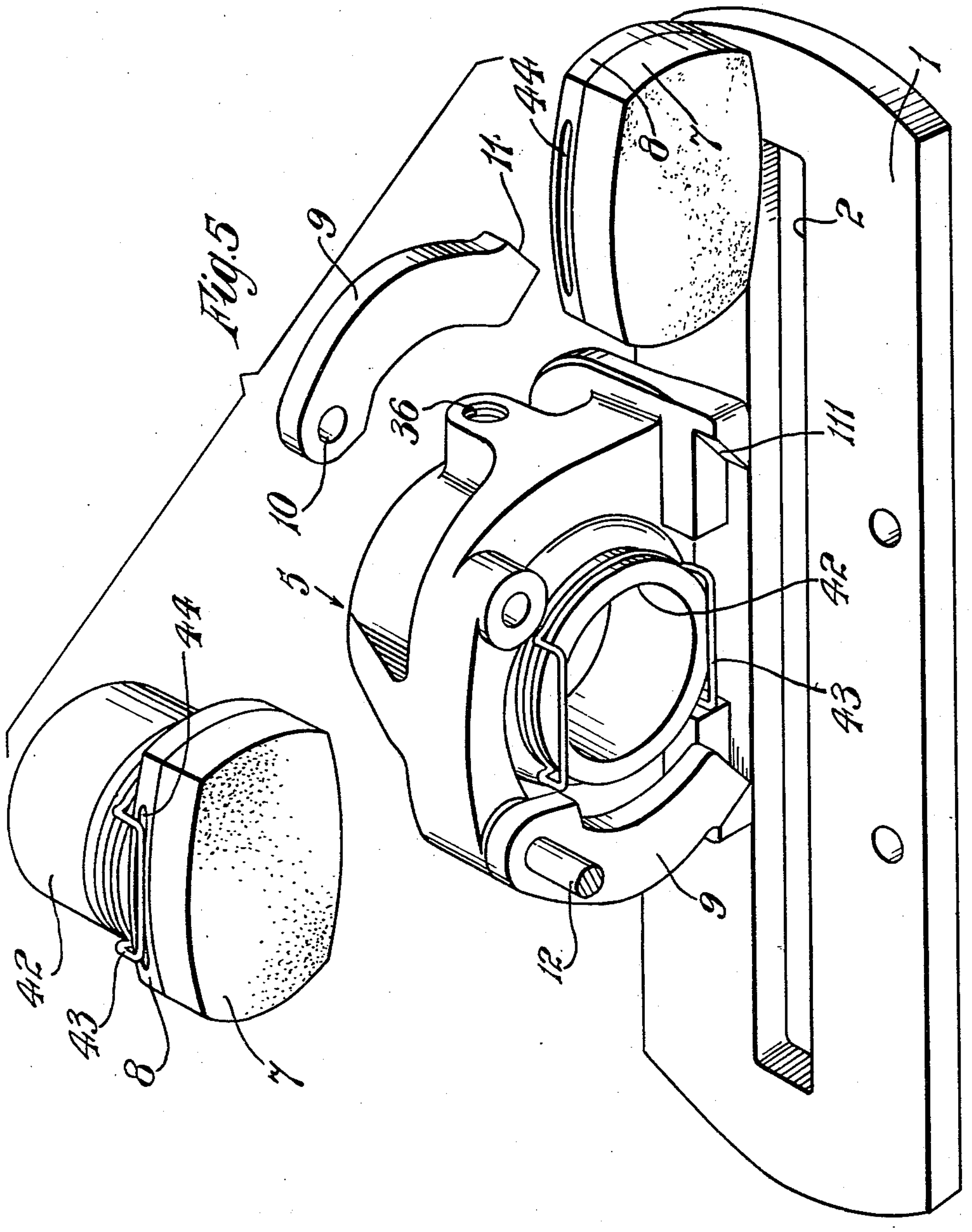
FIGURE 5 is an exploded view showing the component parts of one of the housings.

The friction pad assemblies may be removed sideways, when the pads require renewal, as shown in FIGURE 5 by removing one of the tie bolts 12 and the guides 9 fitted thereto.

The piston and cylinder mechanism in each housing may be replaced by a bellows mechanism, pressure-tight sac or any other suitable fluid pressure device.

Figure 6:
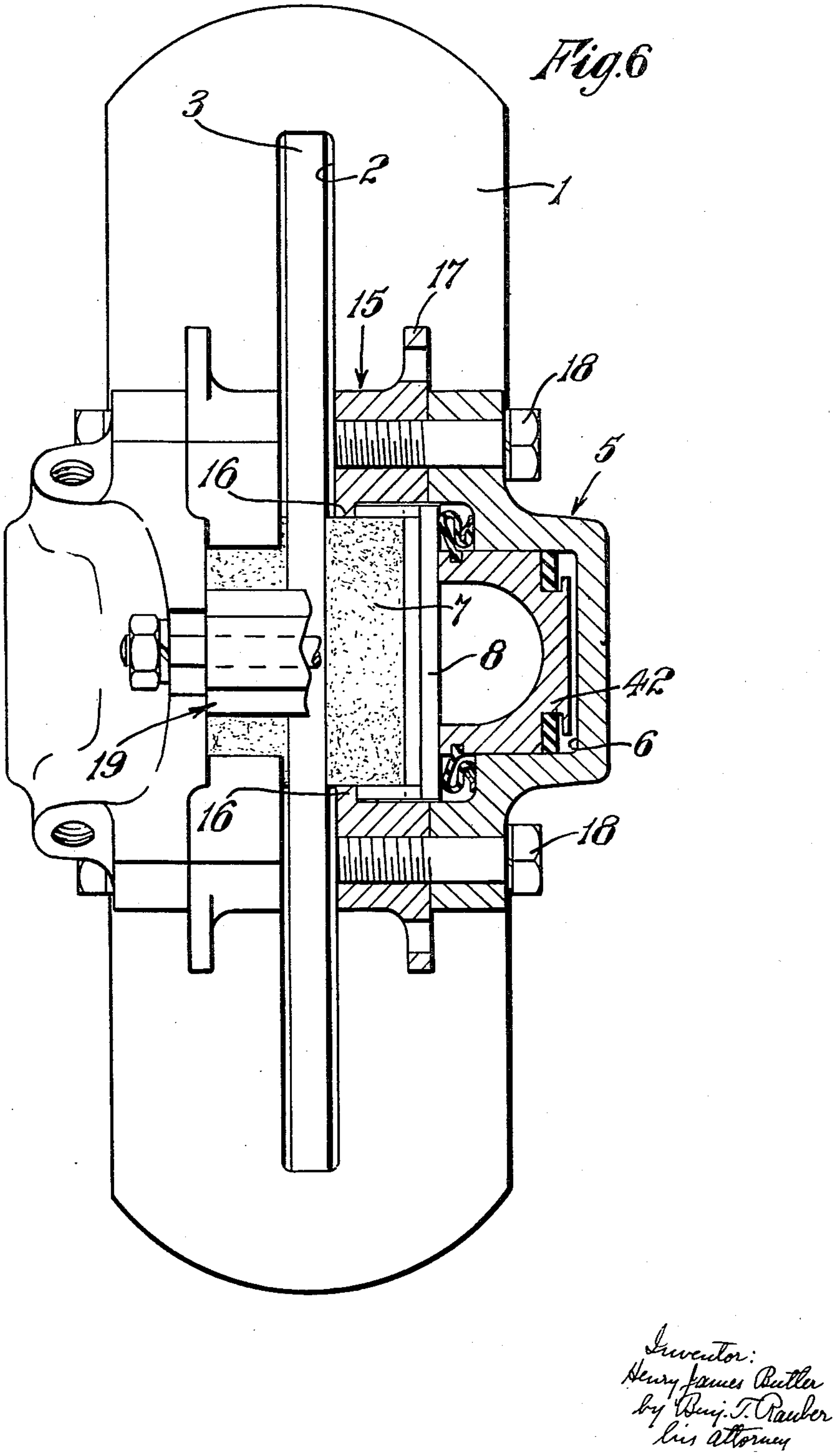
FIGURE 6 is an end elevation, partly in section, of a second form of disc brake.
Figure 7:
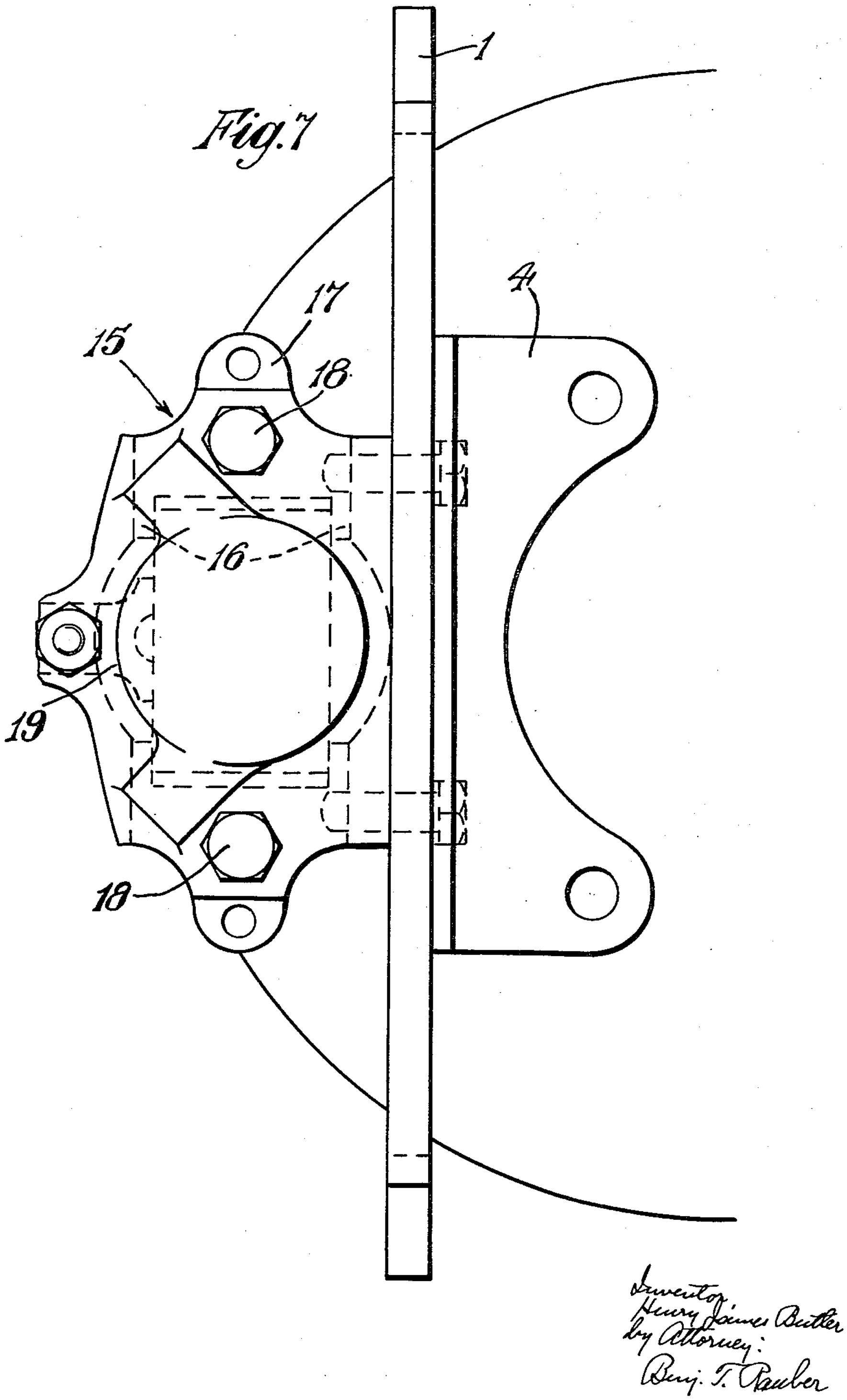
FIGURE 7 is a corresponding side elevation.

The brake illustrated in FIGURES 6 and 7, is essentially similar to the brake described above and the pad assemblies may again be withdrawn sideways.

In FIGURES 6 and 7 the housings 5 are connected by a single tie member 19 and each of the guides 15 for the friction pad assemblies has two lugs 16 which coact with the pads 7. The guides 15 are secured to the housings 5 by detachable bolts 18 which, when detached, permit the sideways removal of the pad assemblies. The guides are also formed with lugs 17 formed with holes to facilitate removal and fitting. In this embodiment of the invention the friction pad assemblies are removable without detachment of the tie member 19.

Figure 8:
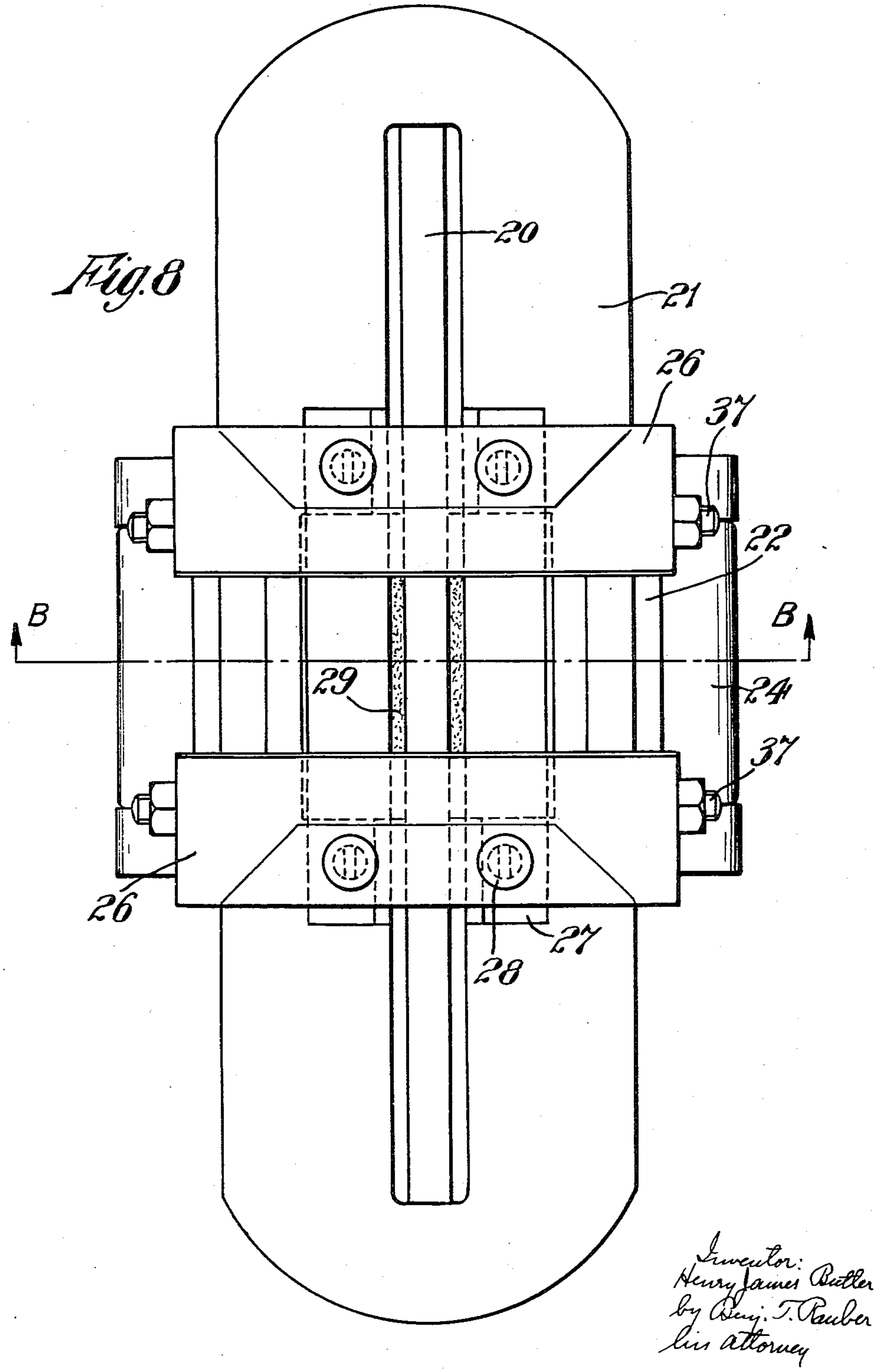
FIGURE 8 is an end elevation of a third form of disc brake.
Figures 9, 10:
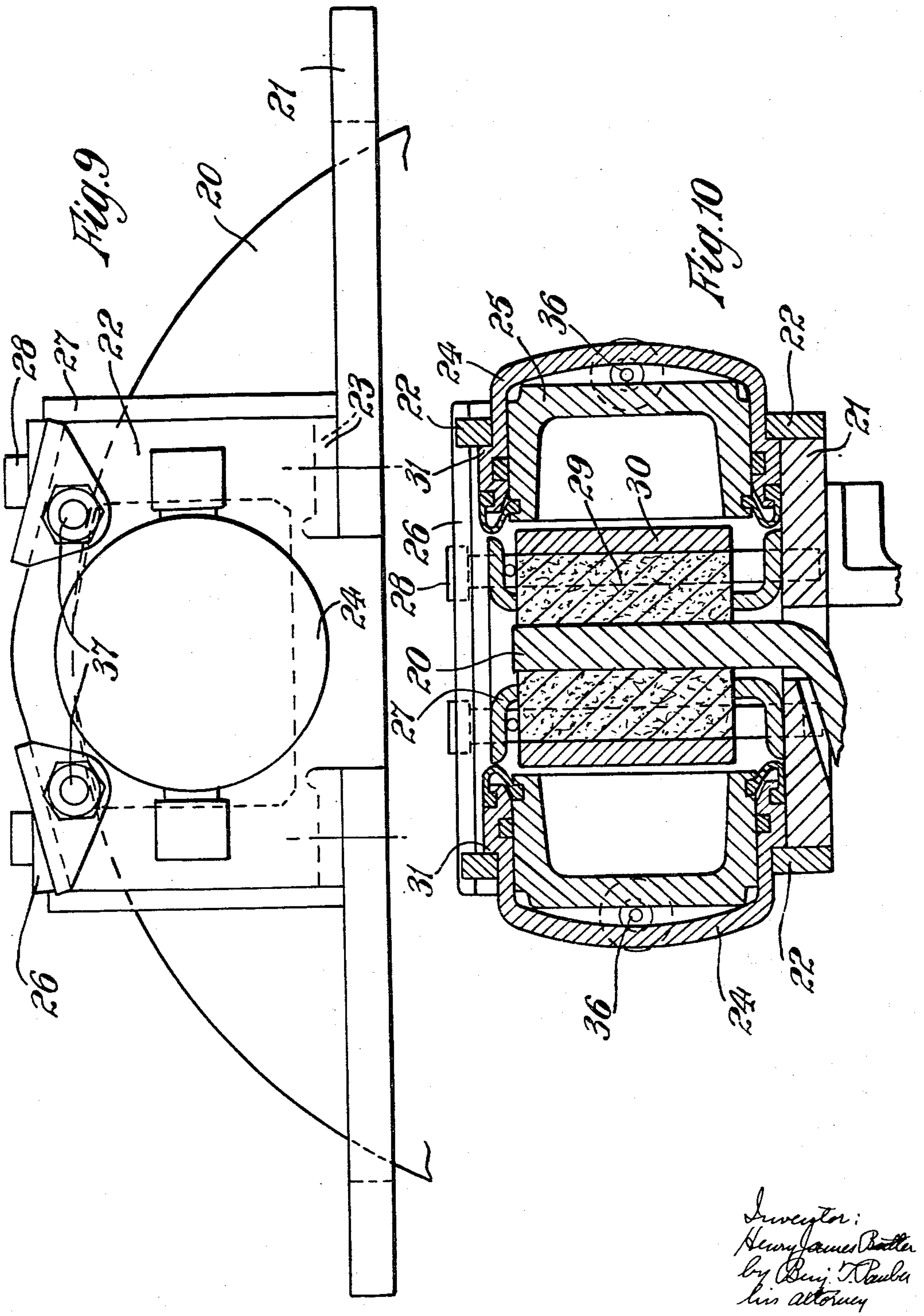
FIGURE 9 is a corresponding side elevation.
FIGURE 10 is a section on the line B—B in FIGURE 8.

In the arrangement illustrated in FIGURES 8, 9 and 10, the disc 20 and slotted base-plate 21 remain as before and a re-action member is secured to the outer edge of said base-plate on each side of the disc.

Each reaction member is constituted by a plate 22, extending upwardly from the plane of the base-plate, and having two inturned lugs 23 by which it is bolted to the base-plate. Each plate 22 is provided centrally with a circular aperture into which a cylinder 24 is fitted with its closed end outermost. An annular flange 31 on the cylinder 24 locates it in the aperture. The base of the cylinder has an inlet 36 for admission of fluid under pressure and a piston 25 is provided in the cylinder. The re-action members 22 are interconnected adjacent the periphery of the disc by straps 26 secured to the reaction members by bolts 37.

Mounted between each piston 25 and the adjacent braking face of the disc is a rectangular frame 27 constituting a guide for a friction pad assembly as shown most clearly in FIGURE 10. The frame 27 is located in position by means of pins 28 which extend through the straps 26, through holes in the inturned portions of the frame 27 and into recesses in the base-plate 21.

Each friction pad assembly comprises a friction pad 29 and a backing plate 30 secured thereto and abutting the piston 25. The frames 27 take the torque when the brake is applied and the piston and cylinder mechanisms are completely relieved from any tangential forces. On removing the pins 28 the frames 27 may be slid sideways, along the surface of the base-plate, to permit of sideways withdrawal of the friction pad assemblies.

While the base-plate has been illustrated as formed integrally from a single piece of metal, it may, if desired, be of two-part construction. Thus it may be constituted by two members located side-by-side and defining opposite sides of the slot, said members being rigidly connected together at their opposite ends. Alternatively it may be formed of a member of horse-shoe form, the limbs of which define the slot, and a bridge-piece rigidly connected to the free ends of the limbs of the horse-shoe.

Having now described my invention, what I claim is:

1. A disc brake comprising a disc rotatable on an axis normal to the plane of and extending through the center of said disc; a brake applying unit comprising a non-rotatable plate parallel to the axis of rotation of said disc and having a slot through which a segment of said disc projects, a pair of brake applying elements rigidly mounted on said plate one on each side of said projecting segment of said disc, and removable bolts beyond the periphery of said disc connecting said brake applying elements; a pair of friction elements one between each said brake applying element and said disc in position to be moved by said brake applying elements into frictional engagement with said disc; and torque sustaining elements secured by said bolts, at least one on each side of said disc, positioned to sustain forces imposed on said friction elements by the drag of the disc and being releasably secured by said releasable bolts to said brake applying unit to permit removal of said friction elements in a direction parallel to the plane of rotation of said disc upon removal of said bolts.

2. The disc brake of claim 1 in which said plate is provided with an abutment for one end of each torque sustaining element, the other end of each said torque sustaining element being secured by one of said bolts.

References Cited in the file of this patent

UNITED STATES PATENTS

| | | |
|---|---|---|
| 2,820,530 | Chouings et al. | Jan. 21, 1958 |
| 2,894,607 | Butler | July 14, 1959 |
| 2,915,147 | Davis | Dec. 1, 1959 |
| 2,948,356 | Butler | Aug. 9, 1960 |
| 2,994,410 | Burnett | Aug. 1, 1961 |
| 3,005,522 | Butler | Oct. 24, 1961 |

FOREIGN PATENTS

| | | |
|---|---|---|
| 818,077 | Great Britain | Aug. 12, 1959 |
| 1,203,734 | France | Aug. 3, 1959 |
| 1,229,040 | France | Mar. 21, 1960 |